(No Model.)
C. A. KOHL.
WRINGER ROLLER.
No. 449,545. Patented Mar. 31, 1891.
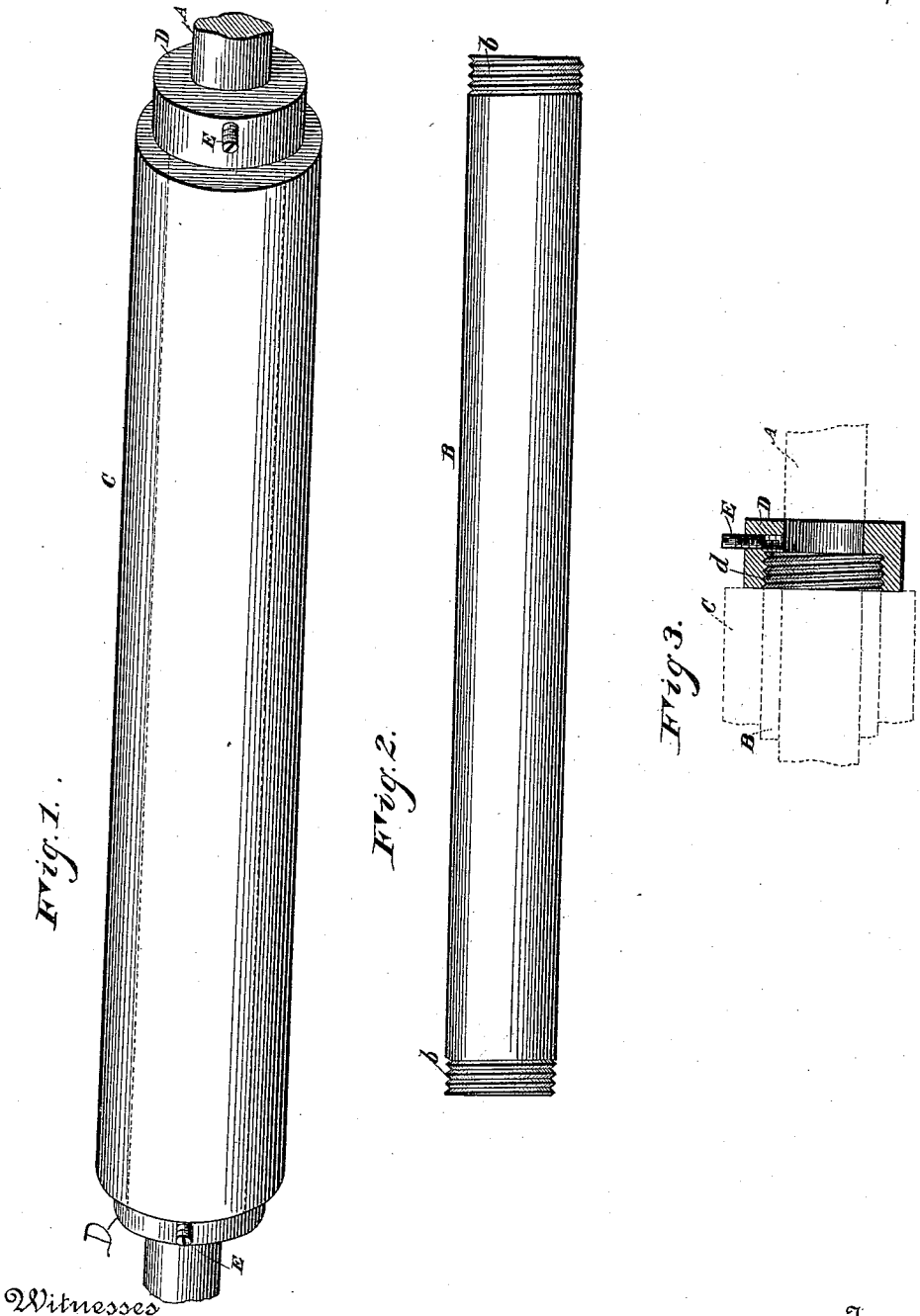

UNITED STATES PATENT OFFICE.

CHARLES A. KOHL, OF CLEVELAND, OHIO, ASSIGNOR TO HIMSELF, MARTIN KOHL, F. WILLIAM KOHL, AND EDWARD KOHL, ALL OF SAME PLACE.

WRINGER-ROLLER.

SPECIFICATION forming part of Letters Patent No. 449,545, dated March 31, 1891.

Application filed January 10, 1891. Serial No. 377,359. (No model.)

*To all whom it may concern:*

Be it known that I, CHARLES A. KOHL, a citizen of the United States, residing at Cleveland, in the county of Cuyahoga and State of Ohio, have invented certain new and useful Improvements in Wringer-Rollers; and I do hereby declare the following to be a full, clear, and exact description of the invention, such as will enable others skilled in the art to which it appertains to make and use the same.

It has been found in practice that the rubber covering of the roller ordinarily used in a wringer wears out before the other parts of the machine.

The object of my invention is to produce an improvement in construction of that class of wringer-rollers in which the covering may be removed or replaced, as desired or needed; and it consists in certain novelty in the construction, arrangement, and combination of the various parts of the same, all of which I will now proceed to point out and describe, reference being had to the accompanying drawings, in which—

Figure 1 is a perspective view of a completed roller embodying my invention, showing the same mounted upon a shaft, dotted lines indicating the hollow tube mounted on said shaft, upon which the rubber covering is mounted. Fig. 2 is an elevation of the hollow tube having the retaining nuts or washers removed therefrom; and Fig. 3 is a perspective view of one of the retaining nuts or washers, the set-screw of the same being partially removed.

Referring to said drawings, A indicates the shaft of a clothes-wringer, said shaft being of ordinary construction and such as is used in machines of this class, the shaft adapted to be connected by any suitable mechanism with the driving-power when placed in the machine.

B is a hollow cylindrical tube of the required length and diameter for the roller desired, which is mounted upon the shaft, and is provided with screw-threaded ends $b$, for a purpose hereinafter set forth. Said tube is preferably constructed of ordinary gas-pipe and is provided with a covering of rubber or other suitable material of the proper thickness. The screw-threaded ends $b$ project slightly beyond the rubber covering C.

D are retaining nuts or washers which are passed over the shaft, provided on their inner sides with an enlarged screw-threaded recess $d$, and are screwed upon the projecting ends of the hollow metallic tube, binding against the rubber covering thereof. Said washers are provided with set-screws E, which engage with the shaft A and securely hold the tube and covering upon said shaft. The retaining nuts or washers are preferably made of galvanized iron and the set-screws of steel.

Having thus fully described my invention, what I claim as new, and desire to secure by Letters Patent, is—

A wringer-roller consisting of a shaft, in combination with a hollow tube covered with rubber or other suitable material and mounted upon said shaft and provided with screw-threaded ends, retaining-nuts adapted to be screwed upon the ends of the tube, and set-screws mounted in said nuts and engaging the shaft, substantially as shown and described.

In testimony whereof I affix my signature in presence of two witnesses.

CHARLES A. KOHL.

Witnesses:
ROBERT T. MORROW,
WILLIAM F. KOHL.